(12) United States Patent
Hossain et al.

(10) Patent No.: US 12,098,285 B1
(45) Date of Patent: Sep. 24, 2024

(54) BIO-BASED WEARABLE FILMS AND METHOD OF PREPARATION THEREOF

(71) Applicant: IMAM MOHAMMAD IBN SAUD ISLAMIC UNIVERSITY, Riyadh (SA)

(72) Inventors: ABM Sharif Hossain, Riyadh (SA); Mohammed Saad Aleissa, Riyadh (SA); Hassan Ahmed Rudayni, Riyadh (SA); Naif M. A. Alotaibi, Riyadh (SA); Mohammed Ibrahim Alghonaim, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/647,895

(22) Filed: Apr. 26, 2024

(51) Int. Cl.
*C08L 97/02* (2006.01)
*C08J 5/18* (2006.01)
(Continued)

(52) U.S. Cl.
CPC .............. *C08L 97/02* (2013.01); *C08J 5/18* (2013.01); *C08K 5/0041* (2013.01); *C09B 61/00* (2013.01); *C08J 2397/02* (2013.01); *C08J 2401/02* (2013.01); *C08J 2403/02* (2013.01); *C08J 2429/10* (2013.01); *C08J 2499/00* (2013.01); *C08K 5/053* (2013.01); *C08K 2201/018* (2013.01); *C08L 27/06* (2013.01); *C08L 2203/16* (2013.01); *C08L 2205/035* (2013.01); *C08L 2205/16* (2013.01)

(58) Field of Classification Search
CPC .... C08L 27/06; C08L 3/00; C08L 1/00; C08L 2201/06; C08K 2201/018; C08K 5/053; A41D 19/00; A41D 19/0055
See application file for complete search history.

(56) References Cited

U.S. PATENT DOCUMENTS 6,630,152 B2    10/2003  Chou
8,329,601 B2 *  12/2012  Shi ................... B32B 27/20
                                                    524/498
(Continued)

FOREIGN PATENT DOCUMENTS

AU    2021106722 A4   12/2021
CN    104962010 A  *  10/2015  .............. C08L 27/06
(Continued)

OTHER PUBLICATIONS

U.S. Appl. No. 18/639,365 "Bio-derived X-ray Sensitive Film and a Method of Preparation Thereof." filed Apr. 18, 2024. (Year: 2024).*
(Continued)

*Primary Examiner* — Rip A Lee
(74) *Attorney, Agent, or Firm* — Oblon, McClelland, Maier & Neustadt, L.L.P.

(57) ABSTRACT

A bio-derived wearable film includes an acid-hydrolyzed palm stem pith, a starch, a cellulose, a synthetic polymer, a plant hydrogel, glycerin, and a dye, and a method of producing the bio-derived wearable film. The bio-wearable film has a water absorption of 0.00 to 0.16% measured according to ASTM D570; a carbonate content of 100 to 200 ppm; and shows no cracks when tested according to ASTM D5419.

20 Claims, 9 Drawing Sheets

(51) Int. Cl.
*C08K 5/00* (2006.01)
*C08L 27/06* (2006.01)
*C09B 61/00* (2006.01)
*C08K 5/053* (2006.01)

(56) References Cited

U.S. PATENT DOCUMENTS

| | | | |
|---|---|---|---|
| 8,524,811 B2 * | 9/2013 | Shi | C08J 5/18 |
| | | | 524/47 |
| 8,759,279 B2 * | 6/2014 | Funk | C08J 5/18 |
| | | | 524/48 |
| 9,074,080 B2 * | 7/2015 | Bauers | C08L 51/04 |
| 9,375,703 B2 * | 6/2016 | Harlin | B01J 20/3021 |
| 11,345,831 B2 | 5/2022 | Spender et al. | |
| 2005/0106294 A1 * | 5/2005 | Stalberg | A22C 13/0013 |
| | | | 426/135 |
| 2006/0106136 A1 * | 5/2006 | Abu-Sharkh | C08L 97/02 |
| | | | 524/27 |
| 2010/0163449 A1 * | 7/2010 | Park | C08L 97/02 |
| | | | 206/524.6 |
| 2010/0257657 A1 | 10/2010 | Hamann et al. | |
| 2014/0005323 A1 | 1/2014 | Deviseme et al. | |
| 2022/0041905 A1 * | 2/2022 | Boaventura | C08L 23/06 |
| 2022/0275201 A1 * | 9/2022 | Dong | C08L 67/04 |

FOREIGN PATENT DOCUMENTS

| | | | | |
|---|---|---|---|---|
| CN | 105837906 A | * | 8/2016 | C08L 23/06 |
| CN | 108410090 A | * | 8/2018 | C08L 27/06 |
| WO | WO-2019038116 A1 | * | 2/2019 | B27N 3/002 |

OTHER PUBLICATIONS

Lovato et al. ; Performance-Enhancing Materials in Medical Gloves ; Journal of Functional Biomaterials, 14 ; Jun. 30, 2023 ; 34 Pages.
Syuhada et al. ; Waste Natural Polymers as Potential Fillers for Biodegradable Latex-Based Composites: A Review ; MDPI Polymers, 13 ; Oct. 19, 2021 ; 20 Pages.

\* cited by examiner

BIO-BASED WEARABLE FILMS AND METHOD OF PREPARATION THEREOF

BACKGROUND

Technical Field

The present disclosure is directed to a wearable film, particularly to a wearable film derived from biological materials, and a method of preparation thereof.

Description of Related Art

The "background" description provided herein presents the context of the disclosure generally. The work of the presently named inventors, to the extent it is described in this background section, as well as aspects of the description that may not otherwise qualify as prior art at the time of filing, are neither expressly nor impliedly admitted as prior art against the present invention.

Wearable films are commonly-used in a variety of circumstances and activities to provide protection to a human or animal. In the medical setting, for example, wearable films are frequently used to prevent contamination or infection. Gloves, for example, are generally used as a protective measure to protect the hands from the objects handled by the wearer of gloves and to protect the hands from those objects. Typically, the gloves are made of thin and/or elastic material to minimize the space between the skin and the glove and to allow the glove to move with the hand.

Conventional wearable films are made from synthetic materials, commonly derived from petroleum products. Petroleum-based films, however, are associated with various disadvantages. The use of petroleum products in the production of conventional films presents problems related to the non-renewable nature of petroleum. Considering that many wearable films are disposable and are intended for only a single use, the use of a non-renewable source material represents a huge resource expenditure. Further, typical petroleum-based wearable films are not readily degradable in the environment. They are not readily biodegradable and can cause problems with waste management. In addition, the source materials, materials used in various stages of processing and fabrication, and the methods of producing petroleum-based wearable films can cause detrimental impacts to both human health and the environment. Toxic materials may be inadvertently released into the environment, such as rivers and oceans, harming local populations and wildlife. Conventional petroleum-based materials also present disadvantageous properties for use as wearable films. For example, hand sweating and itchiness is a common problem faced by a glove wearer which is due to poor air circulation resulting from tight fit and lack of breathability. Prolonged wearing of synthetic gloves can cause a moist environment on the surface of the hand, thereby causing the growth and multiplication of viruses, bacteria, yeast, and fungus. Conventionally, powders are generally donned on the inner surface of the gloves to overcome the drawbacks associated with itching and sweating. However, these powders are known to cause skin dryness. Further, come users are unable to use conventional wearable films due to allergies.

Accordingly, an object of the present disclosure is to provide eco-friendly gloves/wearable films that overcome the limitations of the art.

SUMMARY

The present application relates to a method of producing a bio-derived wearable film. In some embodiments, the method includes blending palm stem pith and water to form a raw plant mixture, heating the raw plant mixture to form a cooked plant mixture, acid treating the cooked plant mixture with an aqueous acid at 30 to 60° C. to form a treated plant mixture, mixing the treated plant mixture with a starch, a cellulose, a synthetic polymer, a plant hydrogel, glycerin, and a dye to form an uncured mixture, heating the uncured mixture to 125 to 175° C. to form a cured mixture, and drying the cured mixture at 60 to 100° C. to form the bio-derived wearable film.

In some embodiments, the palm stem pith is undried date palm stem pith.

In some embodiments, the raw plant mixture is heated to 125 to 175° C. at 15 to 45 pounds per square inch (PSI) gauge.

In some embodiments, the method further includes, prior to heating the raw plant mixture, washing the palm stem pith with a sodium hypochlorite solution.

In some embodiments, the aqueous acid is 80% sulfuric acid.

In some embodiments, the starch is present in an amount of 5 to 15 wt. %, the synthetic polymer is present in an amount of 2.5 to 7.5 wt. %, the plant hydrogel is present in an amount of 12.5 to 22.5 wt. %, the glycerin is present in an amount of 3.5 to 8.5 wt. %, and the treated plant mixture is present in an amount of 31.5 to 76.5 wt. %, each based on the total weight of the bio-derived wearable film.

In some embodiments, the synthetic polymer is polyvinyl chloride.

In some embodiments, the plant hydrogel comprises aloe vera gel, okra gel, and Acacia *arabica* gel.

In some embodiments, the method further includes adjusting the pH of the uncured mixture to a pH of 6.5 to 8.5.

In some embodiments, the dye is a dye derived from a flower in the genus *Bougainvillea*. In some embodiments, the dye is obtained by blending a flower in the genus *Bougainvillea* and water to form a flower extract; adding ethanol to the flower extract to form a raw dye mixture, and heating the raw dye mixture to 25 to 65° C. to produce the dye.

In some embodiments, the bio-derived wearable film comprises 32.5 to 45 wt. % cellulose based on a total weight of bio-derived wearable film. In some embodiments, the bio-derived wearable film has a tensile modulus of 0.25 to 2.0 GPa. In some embodiments, the bio-derived wearable film has a tensile strength of 50 to 100 MPa/kg·m$^3$.

The present application also relates to a bio-derived wearable film is described. In some embodiments, the bio-derived wearable film includes an acid-hydrolyzed palm stem pith, starch, cellulose, a synthetic polymer, a plant hydrogel, glycerin, and a dye.

In some embodiments, the starch is present in an amount of 5 to 15 wt. %, the synthetic polymer is present in an amount of 2.5 to 7.5 wt. %, the plant hydrogel is present in an amount of 12.5 to 22.5 wt. %, and the glycerin is present in an amount of 3.5 to 8.5 wt. %, each based on a total weight of bio-derived wearable film.

In some embodiments, the bio-derived wearable film comprises nanocellulose having a mean particle size of 10 to 35 nm.

In some embodiments, the bio-derived wearable film comprises 32.5 to 45 wt. % cellulose based on a total weight of the bio-derived wearable film. In some embodiments, the bio-derived wearable film has a tensile modulus of 0.25 to 2.0 GPa. In some embodiments, the bio-derived wearable film has and has a tensile strength of 50 to 100 MPa/kg·m$^3$.

In some embodiments, the synthetic polymer is polyvinyl chloride. In some embodiments, the plant hydrogel comprises aloe vera gel, okra gel, and Acacia *arabica* gel.

In some embodiments, the bio-derived wearable film has a water absorption of 0.00 to 0.16%, measured according to ASTM D570. In some embodiments, the bio-derived wearable film has a carbonate content of 100 to 200 ppm. In some embodiments, the bio-derived wearable film shows no cracks when tested according to ASTM D5419.

In some embodiments, the dye is a dye derived from a flower in the genus *Bougainvillea*. The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
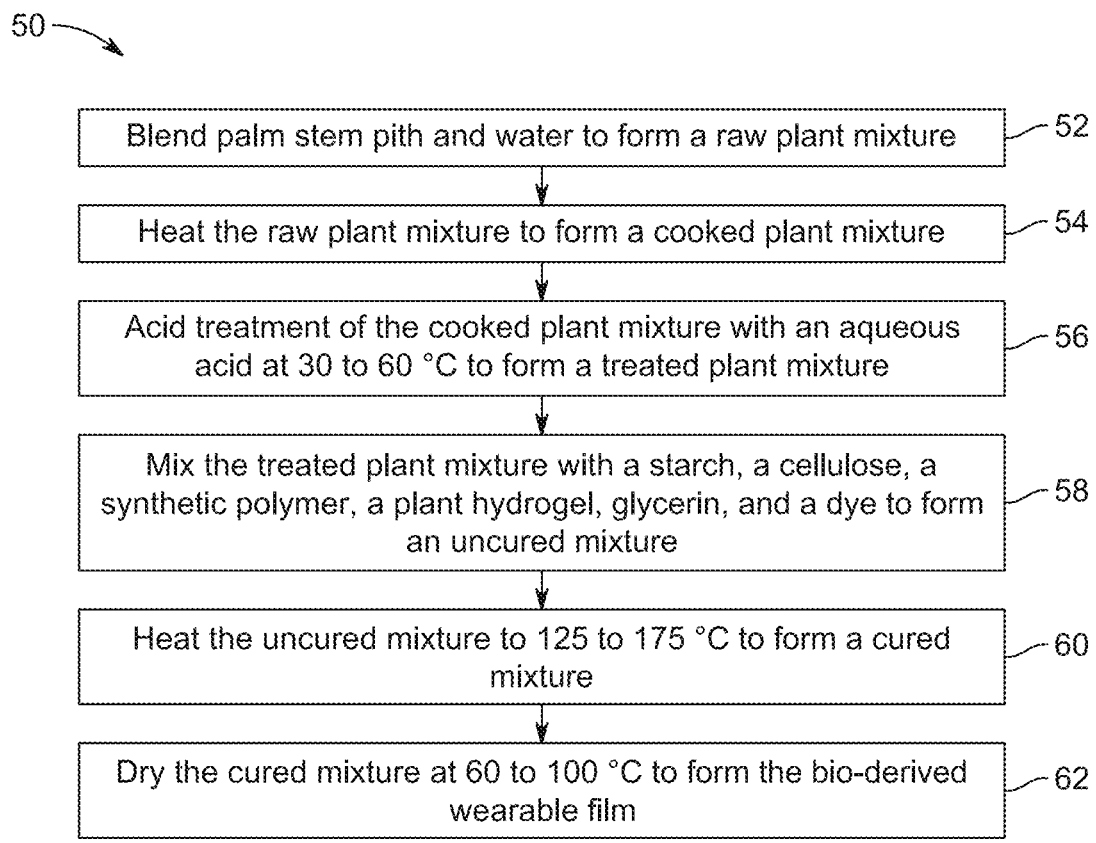
FIG. 1A is a flowchart depicting a method of producing a bio-derived wearable film, according to certain embodiments.
Figure 1B:
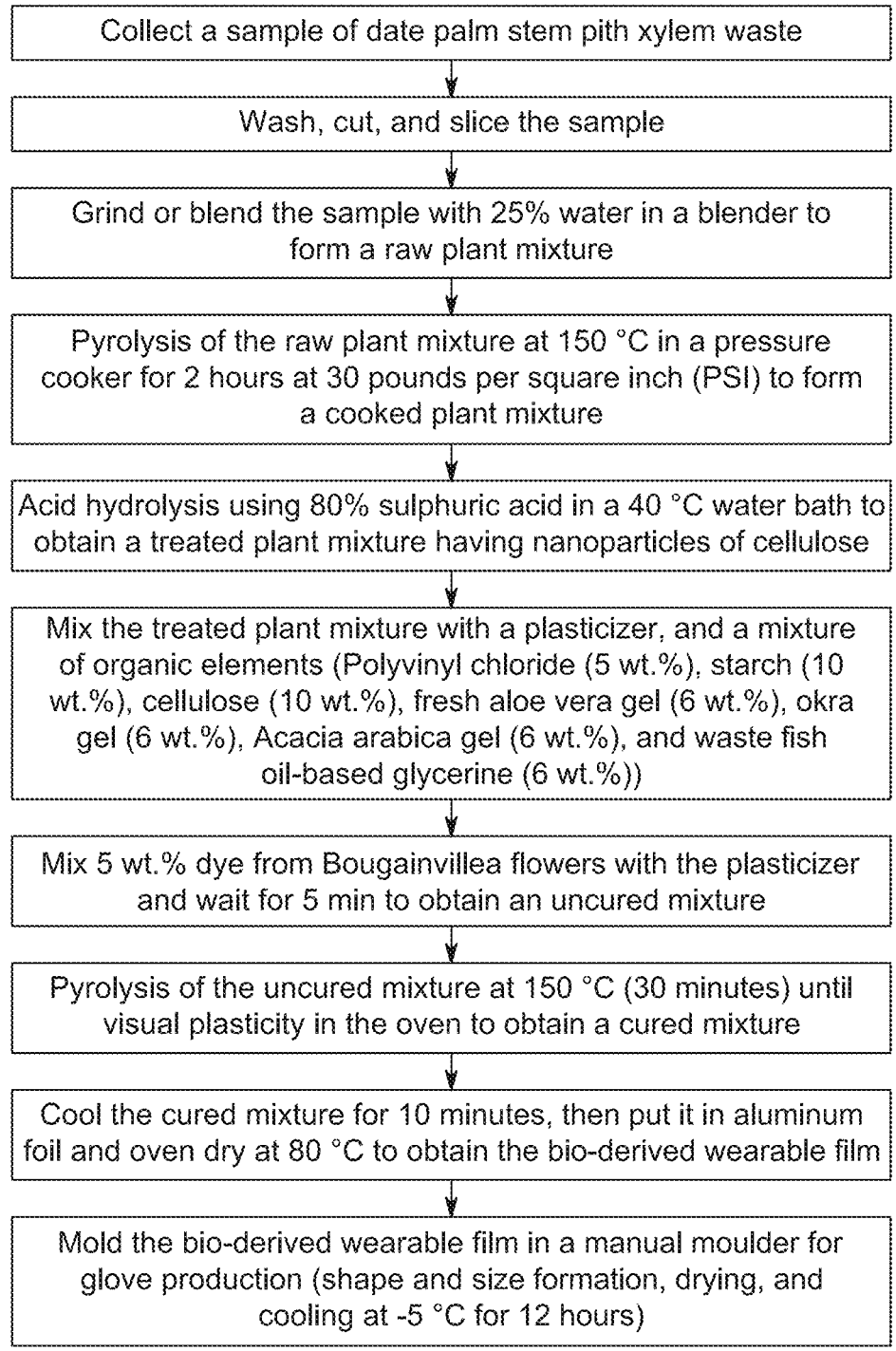
FIG. 1B is a flowchart depicting a method of preparing the bio-derived wearable film, according to certain embodiments, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

The use of the terms "include," "includes", "including," "have," "has," or "having" should be generally understood as open-ended and non-limiting unless specifically stated otherwise. The present disclosure is intended to include all hydration states of a given compound or formula, unless otherwise noted or when heating a material.

Bio-Derived Wearable Film

Aspects of the present disclosure are directed to an eco-friendly wearable film derived from biological materials (e.g., naturally occurring materials or materials formed by living organisms), such as plant/plant parts, animals, bacteria, fungi, and other life forms. In some embodiments, the wearable film of the present disclosure is prepared from plant parts. Since a substantial portion or all of the wearable film is composed of elements derived from plant sources, the wearable film of the present disclosure may be referred to as a "bio-derived" wearable film or film. The film of the present disclosure may be a part of an article such as a glove, a mask, a gown, a condom, a finger cot, a dental dam, an exercise band, a wearable medical device, and the like. In some embodiments, the film may be coated on or form an inner surface of the article. For example, for gloves, the inner surface may refer to the layer of the glove that is in intimate contact with the wearer (i.e., directly adjacent the wearers skin). In some embodiments, the film may be coated on or form an outer surface of the article. In some embodiments, the film may form both an inner and an outer surface. In some embodiments, one such film may form the inner surface and different such film may form the outer surface. In some embodiments, the same film forms both the inner surface and the outer surface. That is, one side of the film may form the inner surface while the other side of the film may form the outer surface. In some embodiments, the article or a portion thereof consists essentially of the film. In some embodiments, the film of the present disclosure is biodegradable and non-toxic, thereby overcoming the challenges associated with synthetic wearable films.

In some embodiments, the film includes an acid-hydrolyzed palm stem pith, starch, cellulose, a synthetic polymer, a plant hydrogel, glycerin, and a dye.

In general, the acid-hydrolyzed palm stem pith can be formed from or derived from any suitable palm plant. A palm plant refers to a plant in the family Arecaceae. Palm stems (trunks) vary considerably in dimensions and appearance among species, but in general they are cylindrical to slightly tapered and occasionally bulging in shape. Palms may be single stemmed or multi-stemmed (clustering) as a result of branching from axillary buds low on the stem. Only a few species (e.g., *Hyphaene* spp.) routinely exhibit aerial branching.

Palm stems are characterized by having a single apical meristem or growing point, which is also referred to as the bud or heart. All new leaves and flowers develop from the apical meristem. It is surrounded by leaf bases, and, in species with a crownshaft, it is located near the crownshaft-stem interface. Palms have no lateral meristems or vascular cambium, which in dicot and coniferous trees produce additional xylem internally and phloem and bark externally. Anatomically, palm stems are typical of monocots, with xylem (water-conducting tissue) and phloem (carbohydrate-conducting tissue) confined to vascular bundles scattered throughout the central cylinder of the stem. In most species, these bundles are concentrated near the periphery of the stem. They are interspersed within a matrix of thin-walled undifferentiated parenchyma cells referred to as "pith". The pith is rich in xylem fibers. These xylem fibers may represent a source of cellulose useful for incorporation into the film of the present disclosure to impart mechanical strength to the film.

Currently, 181 genera with around 2,600 species of palm are recognized. Examples of genera of palms (and select palms in the genera) include, but are not limited to, *Archontophoenix* Bangalow palms, *Areca*—Betel palms, *Astrocaryum, Attalea, Bactris*—Pupunha palms, *Beccariophoenix, Bismarckia*—Bismarck palm, *Borassus*—Palmyra palm, sugar palm, toddy palm, *Butia, Calamus*—Rattan palms, *Ceroxylon, Cocos*—Coconut palms, *Coccothrinax, Copernicia*—Carnauba wax palms, *Corypha*—Gebang palm, *Buri* palm or Talipot palm, *Elaeis*—Oil palms, *Euterpe*—Cabbage heart palm, açaí palm, *Hyphaene*—Doum palms, *Jubaea*—Chilean wine palm, *Coquito* palm, *Latania*—Latan palms, *Licuala, Livistona*—Cabbage palm, *Mauritia*—Moriche palm, *Metroxylon*—Sago palm, *Nypa*—Nipa palm, *Parajubaea*—Bolivian coconut palms, *Phoenix*—Date palms, *Pritchardia, Raphia*—Raffia palm, *Rhapidophyllum, Rhapis, Roystonea*—Royal palm, *Sabal*—Palmettos, *Salacca*—Salak palm, *Syagrus*—Queen palm, *Thrinax, Trachycarpus*—Windmill palm, Kumaon palm, *Trithrinax, Veitchia*—Manila palm, *Joannis* palm, and *Washingtonia*—Fan palm.

In some embodiments, the acid-hydrolyzed palm stem pith is derived from stem pith of the date palm (*Phoenix dactylifera*). *Phoenix dactylifera*, commonly known as date or date palm, is a species of palm cultivated for its edible sweet fruit known as a "date", which is a well-known staple food in North Africa, the Middle East, and many other locations. The date palm pith may be obtained from dried/matured palms, or green/raw palms. Generally, it is preferred to use green or raw palms as they have less lignin content in the xylem fibers. In some embodiments, the date palm piths contain less than 30%, preferably 20%, preferably 10%, and preferably less than 5% of lignin. Although the date palm piths containing lignin at ranges beyond the ranges suggested may be used as well, it is preferred to use xylem fibers from the date palm pith with less amount of lignin. For date palm piths with higher percentages of lignin, the piths may be subjected to a delignification process prior to use.

The acid-hydrolyzed palm stem pith contains cellulose. In some embodiments, the cellulose contained in the acid-hydrolyzed palm stem pith is nanocellulose. In some embodiments, acid-hydrolyzed palm stem pith (and therefore the wearable film) includes nanocellulose in the form of particles, preferably particles in the form of fibrils having a diameter of 5-25 nm or about 10 nm, and a length of 50-100 nm or 70-80 nm.

In general, the nanocellulose particles can be any shape known to one of ordinary skill in the art. Examples of suitable shapes the nanocellulose particles may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For nanocellulose particles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the nanocellulose particles are envisioned as having in any embodiments.

In some embodiments, the nanocellulose particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of nanocellulose particles having a different shape. As used herein, the term "non-uniform shape" refers to an average consistent shape that differs by more than 10% of the distribution of nanocellulose particles having a different shape. In one embodiment, the shape is uniform and at least 90% of the nanocellulose particles are rod-shaped, and less than 10% are polygonal and/or spherical. In another embodiment, the shape is non-uniform and less than 90% of the nanocellulose particles are rod-shaped, and greater than 10% are polygonal and/or spherical.

In some embodiments, the nanocellulose particles have a mean particle size of 10 to 35 nm, preferably 12.5 to 30 nm, preferably 15 to 25 nm, preferably 17.5 to 22.5 nm, preferably 19 to 21 nm, preferably 20 nm. In embodiments where the nanocellulose particles are spherical, the particle size may refer to a particle diameter. In embodiments where the nanocellulose particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the nanocellulose particles have an anisotropic shape such as nanorods, the particle size may refer to a length of the nanorod, a width of the nanorod, an average of the length and width of the nanorod. In some embodiments in which the nanocellulose particles have non-spherical shapes, the particle size refers to the diameter of a sphere having an equivalent volume as the particle. In some embodiments in which the nanocellulose particles have non-spherical shapes, the particle size refers to the diameter of a sphere having an equivalent diffusion coefficient as the particle.

In some embodiments, the nanocellulose particles of the present disclosure are monodisperse, having a coefficient of variation or relative standard deviation, expressed as a percentage and defined as the ratio of the particle size standard deviation (o) to the particle size mean (u) multiplied by 100 of less than 25%, preferably less than 10%, preferably less than 8%, preferably less than 6%, preferably less than 5%, preferably less than 4%, preferably less than 3%, preferably less than 2%. In some embodiments, the nanocellulose particles of the present disclosure are monodisperse having a particle size distribution ranging from 80% of the average particle size to 120% of the average particle size, preferably 90-110%, preferably 95-105% of the average particle size. In some embodiments, the nanocellulose particles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

The film further includes a synthetic polymer. Examples of suitable synthetic polymers include polyethers such as polyethylene glycol, polypropylene glycol, polybutylene glycol, polydioxanone, poly(p-phenylene ether), polyoxymethylene, and polyphenyl ether; polysiloxanes such as polydimethylsiloxane, polyolefins such as ployethylene, polystyrene, polyisoprene, and mixtures of these, polyacrylates such as polymethylmethacrylate, poly(benzyl methacrylate), poly(butyl methacrylate), poly(cyclohexyl methacrylate), poly(dodecylmethacrylate), poly(2-ethoxyethyl methacrylate), poly(ethyl methacrylate), poly(hexyl methacrylate), poly(2-methacrylate), poly(isobutyl methacrylate), poly(isopropyl methacrylate), hydroxyethyl poly(methyl methacrylate), poly(octadecyl methacrylate), poly(octyl methacrylate), poly(phenyl methacrylate), poly(propyl methacrylate), and poly(2-chloroethyl methacrylate); polyamides such as nylons such as nylon 4, nylon 6, nylon 11, nylon 46, and nylon 66, polyphthalamides such as poly(TPA/hexamethylenediamine) and poly (TPA/methylpentanediamine), polyurea, and poly(amino acids) such as poly(aspartic acid), poly(glutamic acid), polylysine, and polyalanine; polycarbonates such as polypropylene carbonate, allyl diglycol carbonate, and poly(bisphenol A carbonate), polysulfones, polyimides, poly(halogenated olefins) such as poly(tetrafluoroethylene) (PTFE), polyvinylidene difluoride (PVDF), and polyvinyl chloride (PVC); polyamide-imides, poly(maleic acid), polyacrylamide, polyacrylonitrile, poly(N-vinyl acetamide), polyurethanes, polystyrene, poly(2-vinylpyridine), poly(2-acrylamido-2-methylpropanesulfonic acid), polylactic acid (PLA), acrylonitrile butadiene styrene (ABS), polyacetal, polyvinyl alcohol (PVA), polyethylene terephthalate (PET), polybutyrate, polycaprolactone, polybutylene succinate, polyglocolide, and combinations of these. In a preferred embodiment, the synthetic polymer is PVC.

In some embodiments, the synthetic polymer is present in an amount of 2.5 to 7.5 wt. %, preferably 3 to 7 wt. %, preferably 3.5 to 6.5 wt. %, preferably 4 to 6 wt. %, preferably 4.5 to 5.5 wt. %, preferably 5 wt. %, based on a total weight of the film.

Starch is a polysaccharide (biopolymer). Typically, starch includes amylose and amylopectin. Amylose is a linear polymer of glucose molecules bound to each other through glycosidic bonds. Amylopectin is a branched polymer of glucose molecules. Typically, starch includes about 65 to 85 wt. % amylopectin and about 15 to 35 wt. % amylose, however, the amounts of amylose and amylopectin can depend on the starch source. Some starch sources contain little to no amylopectin while other starch sources contain almost exclusively amylopectin. Different forms of starch may be used, for example, starch derived from corn, tapioca, arrowroot, sago palm (*Metroxylon sagu*), wheat, rice, potato, and/or combinations thereof. In some embodiments, the starch is derived from the sago palm. In some embodiments, the starch is derived from corn. In some embodiments, the starch is a natural (unmodified starch). In some embodiments, the starch is a modified starch. Examples of modified starches include, but are not limited to dextrin, acid-treated starch, alkaline-treated starch, bleached starch, oxidized starch, enzyme-treated starch, monostarch phosphate, distarch phosphate, phosphated distarch phosphate, acetylated distarch phosphate, starch acetate, acetylated distarch adipate, hydroxypropyl starch, hydroxypropyl distarch phosphate, hydroxypropyl distarch glycerol, starch sodium octenyl succinate, acetylated oxidized starch. In some embodiment, the starch may be used in the form of powder. The starch is preferably functionalized with an alkyl or aryl alkyl xanthate, most preferably a secondary or tertiary alkyl xanthate such as isopropyl, isobutyl, isopentyl, neopentyl, neophyl or tertiary butyl xanthate.

In some embodiments, the starch is present in an amount of 5 to 15 wt. %, preferably 6 to 14 wt. %, preferably 7 to 13 wt. %, preferably 8 to 12 wt. %, preferably 9 to 11 wt. %, preferably 10 wt. %, based on a total weight of the film.

In some embodiments, the wearable film includes a plant hydrogel. As used herein, "hydrogel" refers to a gel in which the swelling agent is water. Hydrogels are typically formed of a polymeric material that absorbs several times its own weight of water. The polymeric component of a hydrogel is typically referred to as "gelling agent". Hydrogel forming materials typically swell when absorbing water. Hydrogels can have a wide range of mechanical properties, for example, hydrogels can have a Young's modulus from about 10 Pa to about 3 MPa. Some hydrogels become slick. Hydrogels are typically classified based on the origin of the gelling agent. Hydrogels having synthetic polymer gelling agents can be referred to as "synthetic hydrogels". Examples of synthetic polymer gelling agents include, but are not limited to polyvinyl alcohol, polyethylene glycol, sodium polyacrylate, and the like. Hydrogels having naturally derived polymeric gelling agents can be referred to as "natural hydrogels". Naturally derived polymeric gelling agents typically include polypeptides, polynucleotides, polysaccharides, or combinations of these. When a polymeric gelling agent is derived from a plant, the resulting hydrogel can be referred to as a "plant hydrogel". Some gelling agents derived from plants are referred to as "gum" when not in the form of a hydrogel. In some embodiments, the hydrogels are plant hydrogels. Plant hydrogels help reduce moisture in the glove during wear. Examples of specific naturally derived polymeric gelling agents include, but are not limited to starch, gelatin, chitin, hyaluronic acid, heparin, fibrin glycosaminoglycans lignin, chitosan, alginate, guar gum, and combinations of these. Some hydrogels, particularly naturally derived hydrogels, can be identified based on the source of the hydrogel. This may be advantageous when the exact composition of the hydrogel is not known or is complex. In some embodiment, the plant hydrogel includes one or more selected from aloe vera gel, okra gel, and Acacia *arabica* gel. In some embodiments, the plant hydrogel includes both aloe vera gel and okra gel. In some embodiments, the weight ratio of the aloe vera gel to the okra gel is in the range of 1:5 to 5:1, preferably 1:4 to 4:1, preferably 1:3 to 3:1, preferably 2:1 to 1:2, preferably 1:1. In some embodiments, the plant hydrogel includes both okra gel and Acacia *arabica* gel. In some embodiments, the weight ratio of the okra gel to the Acacia *arabica* gel is preferably 1:5 to 5:1, preferably 1:4 to 4:1, preferably 1:3 to 3:1, preferably 2:1 to 1:2, preferably 1:1. In some embodiments, the plant hydrogel includes both aloe vera gel and Acacia *arabica* gel. In some embodiments, the weight ratio of the aloe vera gel to the Acacia *arabica* gel is preferably 1:5 to 5:1, preferably 1:4 to 4:1, preferably 1:3 to 3:1, preferably 2:1 to 1:2, preferably 1:1. In some embodiments, the plant hydrogel includes okra gel, aloe vera gel, and Acacia *arabica* gel. In some embodiments, the weight ratio of the aloe vera gel to the okra gel to the Acacia *arabica* gel is preferably 1:1:1.

In some embodiments, the plant hydrogel is present in an amount of 12.5 to 22.5 wt. %, preferably 13 to 22 wt. %, preferably 14 to 21 wt. %, preferably 15 to 20 wt. %, preferably 16 to 19 wt. %, preferably 17 to 18.5 wt. %, preferably 18 wt. %, based on a total weight of the film.

In some embodiments, the wearable film includes glycerin. The glycerin may be obtained from animal and plant fat. In some embodiments, the glycerin may be obtained from triglyceride-rich vegetable fats, such as soy, coconut, and palm oils. In some embodiments, the glycerin is obtained from waste-fish oil. In some embodiments, the glycerin may be supplemented with cucumber extract, vitamin E, lanolin, natural moisturizing factor (NMF), ginseng extract, and/or algae extract.

In some embodiments, the glycerin is present in an amount of 3.5 to 8.5 wt. %, preferably 4 to 8 wt. %, preferably 5 to 7 wt. %, preferably 6 wt. %, based on the total weight of the film.

In some embodiments, the wearable film further includes a biodegradable filler. Examples of biodegradable fillers include lignin, hemicellulose, and cellulose not derived from the acid-hydrolyzed palm stem pith. A biodegradable filler may be advantageous for imparting high strength, stiffness, and durability to the film. In some embodiments, the biodegradable filler is cellulose. The cellulose is not derived from the acid-hydrolyzed palm stem pith. In general, the cellulose used as the biodegradable filler can be any suitable cellulose. In some examples, the cellulose is microcrystalline cellulose. The cellulose can be cellulose, alkyl cellulose (also called alkylated cellulose) such as methylcellulose, ethylcellulose, propylcellulose, and the like, and hydroxyalkyl cellulose such as hydroxymethyl cellulose, hydroxyethyl cellulose, hydroxypropyl cellulose, and the like, amino cellulose (also called aminated cellulose) such as aminoethyl cellulose, diethylaminoethyl cellulose, and the like.

In some embodiments, the biodegradable filler is present is present in an amount of 5 to 15 wt. %, preferably 6-14 wt. %, preferably 7-13 wt. %, preferably 8-12 wt. %, preferably 9-11 wt. %, preferably 10 wt. %, based on the total weight of the film.

In some embodiments, wearable film has a total cellulose content of present in an amount of 32.5 to 45 wt. %, preferably 33 to 44.0 wt. %, preferably 33.5 to 43.5 wt. %, preferably 34.0 to 43.0 wt. %, preferably 34.5 to 42.5 wt. %, preferably 35 to 42.0 wt. %, preferably 35.5 to 41.5 wt. %, preferably 36.0 to 41.0 wt. %, preferably 36.5 to 40.5 wt. %, preferably 37.0 to 40.0 wt. %, preferably 37.5 to 39.5 wt. %, preferably 38.0 to 39.0 wt. %, preferably about 38.5 wt. %. That is, in some embodiments, cellulose is present in the wearable film in an amount as described above.

The film further includes a dye. Dyes (also called stains) are frequently added to wearable films to achieve opacification and impart the desired hue to the film. In general, the dye used may be a natural dye or a synthetic dye. Synthetic dyes are typically not environmentally friendly; therefore, the dye/stain used in the present disclosure is preferably derived from a plant. In some embodiments, the dye used in the wearable film is derived from a plant in the genus *Bougainvillea*. *Bougainvillea* is a genus of thorny ornamental vines, bushes, and trees belonging to the four o'clock family, Nyctaginaceae. Plants in the genus *Bougainvillea* are known for their brightly colored flower-shaped structures (typically referred to as flowers). The actual flower of the plant is usually small and generally white, but each cluster of three flowers is surrounded by three or six bracts with the bright colors associated with the plant, including pink, magenta, purple, red, orange, white, or yellow. The combination of the bracts and flowers is typically referred to as a "flower" in colloquial usage. In some embodiments, these flowers are used as the source of the dye. That is, the flower is included among portions of the plant in the genus *Bougainvillea* used to produce the dye. In some embodiments, the plant in the genus *Bougainvillea* may be one or more of *Bougainvillea berberidifolia, Bougainvillea campanulata, Bougainvillea glabra, Bougainvillea herzogiana, Bougainvillea infesta, Bougainvillea lehmanniana, Bougainvillea malmeana, Bougainvillea modesta, Bougainvillea pachyphylla, Bougainvillea peruviana, Bougainvillea praecox, Bougainvillea spectabilis, Bougainvillea spinosa, Bougainvillea stipitata, Bougainvillea trollii, Bougainvillea buttiana, Bougainvillea arborea, Bougainvillea virescens, Bougainvillea bracteata, Bougainvillea pomacea, Bougainvillea herzogiana, Bougainvillea pachphylla, Bougainvillea spinosa, Bougainvillea* lehmanianna, and/or combinations thereof. In some embodiments, the plant in the genus *Bougainvillea* is *Bougainvillea glabra*. In some embodiments, the dye may be prepared from any other plant. The choice of the plant may be based on the desired color of the film. In some embodiments, the film does not include the dye. In some embodiments, the wearable film is opaque. In some embodiments, the wearable film is translucent.

Referring to FIG. 1A, method 50 of producing a bio-derived wearable film is described. The order in which method 50 is described is not intended to be construed as a limitation, and any number of the described method steps can be combined in any order to implement method 50. Additionally, individual steps may be removed or skipped from method 50 without departing from the spirit and scope of the present disclosure.

At step 52, the method 50 includes blending palm stem pith and water to form a raw plant mixture. For this purpose, the palm stem pith may be collected from a suitable palm as described above or sourced commercially. In general, the palm stem pith may be any palm stem pith as described above. In some embodiments, the palm stem pith may be obtained from dried or matured or from green or raw palms. Generally, green or young palms are preferred as they typically have a lower lignin content compared to mature palms. In some embodiments, the method uses palm stem piths containing less than 30%, preferably less than 20%, preferably less than 10%, preferably less than 5% of lignin by mass based on a total weight of palm stem pith. In some embodiments, palm stem piths containing lignin at ranges beyond the suggested ranges may also be used as well. In some embodiments, the palm stem pith is subjected to a delignification process before use in other steps of the method (e.g., the blending). To remove lignin, in some embodiments, the raw plant mixture may be subjected to alkaline hydrolysis with an alkaline solution. The alkaline solution can include a suitable base, such as a carbonate base, a hydroxide base, a bicarbonate base, or combinations of these. Preferably, the delignification process occurs prior to the heating. In some embodiments, the palm stem pith is bleached. The bleaching may be performed with a suitable bleaching agent. Examples of suitable bleaching agents include, but are not limited to, hydrogen peroxide, bleach, chlorine, calcium hypochlorite, sodium hypochlorite, or a combination thereof. In a preferred embodiment, the bleaching agent is sodium hypochlorite.

Figure 2A:
FIGS. 2A-2B are pictorial images of a date palm stem pith with xylem fiber, according to certain embodiments.
Figure 2B:
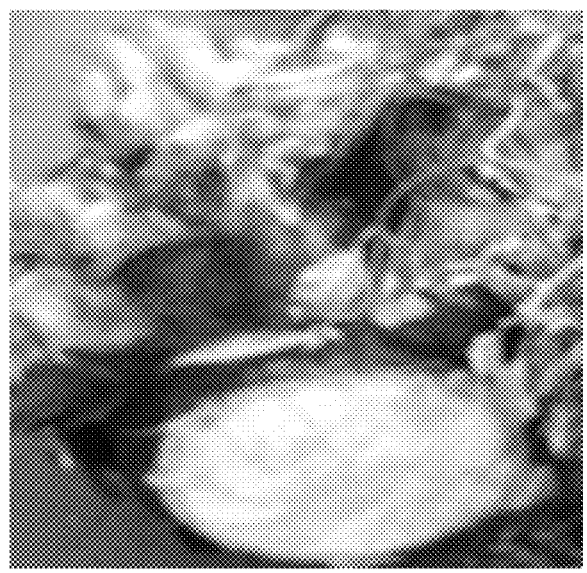
Figure 2C:
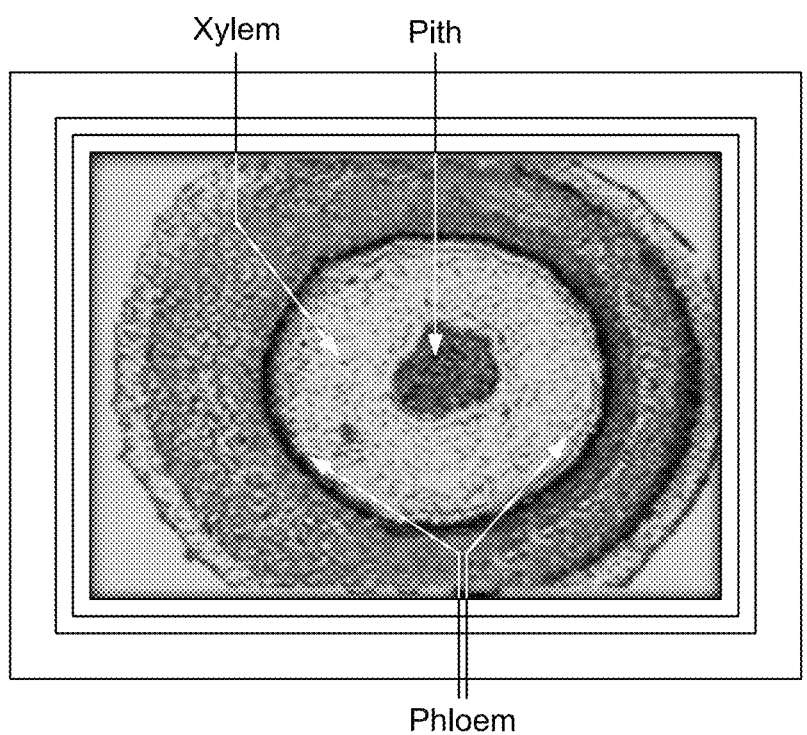
FIG. 2C is a cross-sectional image of the date palm stem pith, according to certain embodiments.

In some embodiments, the palm stem pith is an undried date palm stem pith. An image of an exemplary undried date palm stem pith is depicted in FIGS. 2A-2B. The pith of the palm stem is rich in xylem fibers. These xylem fibers are used in the film preparation process as they can impart tensile/mechanical strength to the film. A cross-sectional image of the date palm showing the pith, xylem, and phloem is provided in FIG. 2C.

Figure 2D:
FIG. 2D shows alkaline hydrolysis of date palm stem pith, according to certain embodiments.

In some embodiments, the palm stem pith may be cut using a suitable instrument (e.g., a chopper or a shredder) into small pieces/slices prior to blending. This reduction in size may be advantageous for facilitating blending. In some embodiments, the pieces or slices have a length of about 1 to 5 cm, preferably 2 to 3 cm. The slices may be further blended. See FIG. 2D.

In some embodiments, the palm stem pith is blended into a raw plant mixture using added water. In some embodiments, the palm stem pith is blended with 50% water, preferably about 45% water, preferably about 40% water, preferably about 35% water, preferably about 30% water, preferably about 25% of water by mass based on a total weight of raw plant mixture. The blending may be carried out in any suitable apparatus, such as a mixer/grinder or any other blending device known in the art.

At step 54, the method 50 includes heating the raw plant mixture to form a cooked plant mixture. The raw plant mixture predominantly includes water, celluloses, and lignin, as well as various other minor components derived from the palm stem pith.

Figure 2E:
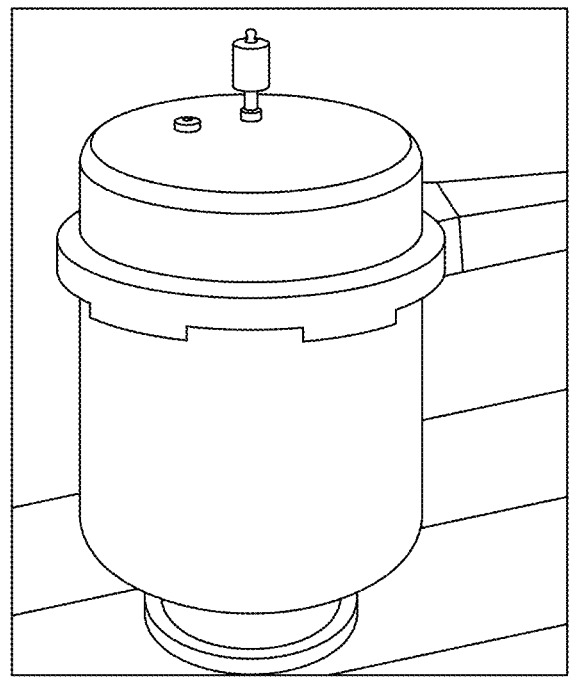
FIG. 2E shows a pictorial image showing pressure heating of the date palm stem pith, according to certain embodiments.

In some embodiments, the raw plant mixture is heated to 125 to 175° C., preferably 130 to 170° C., preferably 135 to 165° C., preferably 140 to 160° C., preferably 145 to 155° C., preferably 150° C. In some embodiments, the raw plant mixture is headed at 15 to 45 pounds per square inch (PSI) gauge, preferably 20 to 40 PSI, preferably 25 to 35 PSI, preferably 30 PSI. In some embodiments, the raw plant mixture is heated for a period of 10 to 60 minutes, preferably 20 to 50 minutes, preferably 30 to 40 minutes, preferably 30 minutes. This process may be referred to a "pyrolysis". Generally, pyrolysis refers to a thermal decomposition process. The pyrolysis of the palm stem pith may in the partial or complete breakdown of cellulose into smaller particles of cellulose, i.e., microcellulose or nanocellulose. See FIG. 2E.

At step 56, method 50 includes acid treating the cooked plant mixture with an aqueous acid to form a treated plant mixture. In general, the aqueous acid can be an inorganic (mineral) acid, an organic acid, or a mixture thereof. Examples of inorganic acids include but are not limited to nitric acid, sulfuric acid, phosphoric acid, perchloric acid, hydrobromic acid, hydrochloric acid, hydroiodic acid, hydrofluoric acid, boric acid, and the like. Examples of organic acids include but are not limited to formic acid, acetic acid, propionic acid, butyric acid, valeic acid, caproic acid, oxalic acid, lactic acid, malic acid, citric acid, carbonic acid, benzoic acid, phenol, uric acid, carboxylic acids, sulfonic acid, and the like. In some embodiments, the aqueous acid is sulfuric acid. In some embodiments, the sulfuric acid is 80% sulfuric acid. In some embodiments, the acid treatment is performed at 30 to 60° C., preferably 40 to 50° C., preferably 40° C. This process may be referred to as acid hydrolysis. Acid hydrolysis may result in the partial or complete conversion of macro or microparticles of cellulose (microcellulose) to nanoparticles (nanocellulose).

At step 58, the method 50 includes mixing the treated plant mixture with a starch, a cellulose, a synthetic polymer, a plant hydrogel, glycerin, and a dye to form an uncured mixture. In general, the starch may be any suitable starch as described above. In a preferred embodiment, the starch may be used in the form of powder. In general, the synthetic polymer may be any suitable synthetic polymer as described above. In a preferred embodiment, the synthetic polymer is PVC. The glycerin may be obtained from animal and plant fat as described above. In some embodiments, the glycerin may be obtained from triglyceride-rich vegetable fats, such as soy, coconut, and palm oils. In a preferred embodiment, the glycerin is preferably obtained from waste-fish oil. The plant hydrogel may be a plant hydrogel as describe above. The dye may be a dye derived from a plant belonging to the *Bougainvillea* genus, preferably *Bougainvillea glabra*, as described above.

Figure 2F:
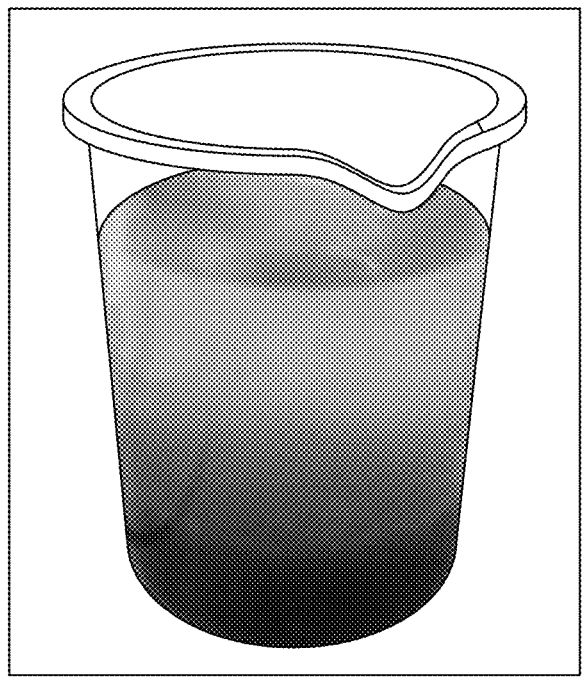
FIG. 2F shows acid hydrolysis of the date palm stem pith with sulfuric acid, according to certain embodiments.

In some embodiments, the starch is present in an amount of 5 to 15 wt. %, preferably 6 to 14 wt. %, preferably 7 to 13 wt. %, preferably 8 to 12 wt. %, preferably 9 to 11 wt. %, preferably 10 wt. % based on the total weight of the uncured mixture. In some embodiments, the synthetic polymer is present in an amount of 2.5 to 7.5 wt. %, preferably 3 to 7 wt. %, preferably 3.5 to 6.5 wt. %, preferably 4 to 6 wt. %, preferably 4.5 to 5.5 wt. %, preferably 5 wt. % based on the total weight of the uncured mixture. In some embodiments, the plant hydrogel is present in an amount of 12.5 to 22.5 wt. %, preferably 13 to 22 wt. %, preferably 14 to 21 wt. %, preferably 15 to 20 wt. %, preferably 16 to 19 wt. %, preferably 17 to 18.5 wt. %, preferably 18 wt. % based on the total weight of the uncured mixture. In some embodiments, the glycerin is present in an amount of 3.5 to 8.5 wt. %, preferably 4 to 8 wt. %, preferably 5 to 7 wt. %, preferably 6 wt. % based on the total weight of the uncured mixture. In some embodiments, the treated plant mixture is present in an amount of 31.5 to 76.5 wt. %, preferably 32.5 to 72.5 wt. %, preferably 35.0 to 70.0 wt. %, preferably 37.5 to 67.5 wt. %, preferably 40.0 to 65.0 wt. %, preferably 42.5 to 62.5 wt. %, preferably 45 to 60 wt. %, based on the total weight of the uncured mixture. In a specific embodiment, about 5 wt. % PVC, 10 wt. % starch, 10 wt. % cellulose, 6 wt. % of aloe vera gel, 6 wt. % of okra gel, 6 wt. % of Acacia *arabica* gel, 6 wt. % waste fish oil-based glycerin, and 5 wt. % *Bougainvillea* dye is added to the treated plant mixture to form an uncured mixture (see FIG. 2F). In some embodiments, the pH of the uncured mixture is adjusted to 6.5 to 8.5, preferably 7 to 8.

In some embodiments, the cellulose is present in an amount of 32.5 to 45 wt. %, preferably 33 to 44.0 wt. %, preferably 33.5 to 43.5 wt. %, preferably 34.0 to 43.0 wt. %, preferably 34.5 to 42.5 wt. %, preferably 35 to 42.0 wt. %, preferably 35.5 to 41.5 wt. %, preferably 36.0 to 41.0 wt. %, preferably 36.5 to 40.5 wt. %, preferably 37.0 to 40.0 wt. %, preferably 37.5 to 39.5 wt. %, preferably 38.0 to 39.0 wt. %, preferably about 38.5 wt. % based on a total weight of uncured mixture.

Figure 2G:
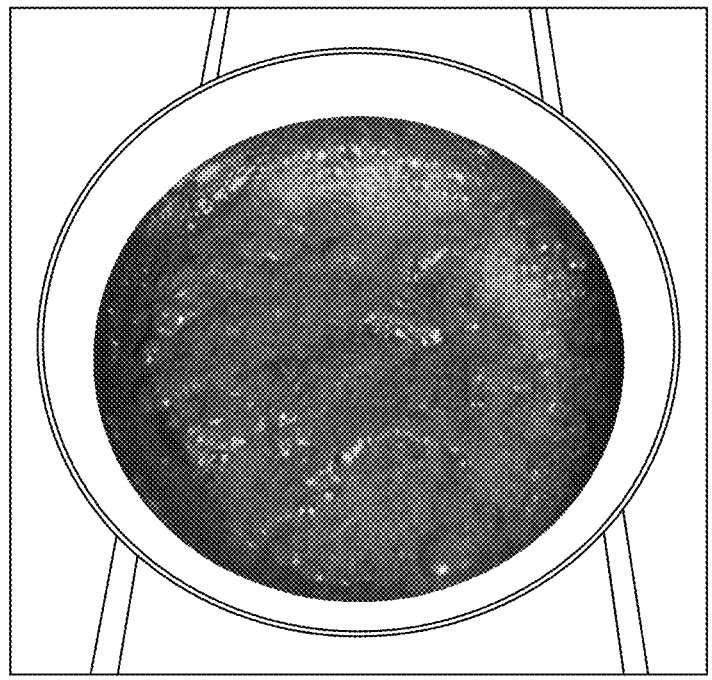
FIG. 2G is a pictorial image showing an uncured mixture in the form of a paste, according to certain embodiments.

At step 60, the method 50 includes heating the uncured mixture to form a cured mixture. In some embodiments, the uncured mixture is heated to a temperature of 125 to 175° C., preferably 130 to 170° C., preferably 135 to 165° C., preferably 140 to 160° C., and preferably 150° C. In some embodiments, the uncured mixture is heated for 10 to 60 minutes, preferably 20 to 50 minutes, preferably 30 to 40 minutes, preferably 30 minutes. Generally, it is preferred to carry out the heating process until a visual plasticity is observed (see FIG. 2G). The heating may be carried out in an oven/mantle.

At step 62, the method 50 includes drying the cured mixture to form the bio-derived wearable film. In some embodiments, the drying is performed at 60 to 100° C., preferably 70 to 90° C., preferably 80° C. In some embodiments, the drying is performed for about 10 to 30 minutes, preferably 10 minutes. The drying process may optionally be carried out on an aluminum foil to speed up the process.

In some embodiments, the bio-derived wearable film has a tensile modulus of 0.25 to 2.0 gigapascals (GPa), preferably 0.5 to 1.5 GPa, preferably 0.75 to 1.25 GPa, preferably 0.9 to 1.1 GPa, preferably about 1.0 GPa. In some embodiments, the bio-derived wearable film has a tensile strength of 50 to 100 MPa/kg·m$^3$, 55 to 90 MPa/kg·m$^3$, preferably 60 to 80 MPa/kg·m$^3$, preferably 65 to 75 MPa/kg·m$^3$, preferably about 70 MPa/kg·m$^3$. In some embodiments, the bio-derived wearable has a water absorption of 0.00 to 0.16%, preferably 0.001 to 0.1%. Preferably, the water adsorption is measured according to ASTM D570. In some embodiments, the bio-derived wearable film has a carbonate content of 100 to 200 ppm, preferably 110 to 190 ppm, preferably 120 to 180 ppm, preferably 125 to 175 ppm, preferably 130 to 160 ppm, preferably 135 to 150 ppm, preferably 140 to 145 ppm. In some embodiments, the film also shows no cracks when tested according to ASTM D5419.

Figure 2H:
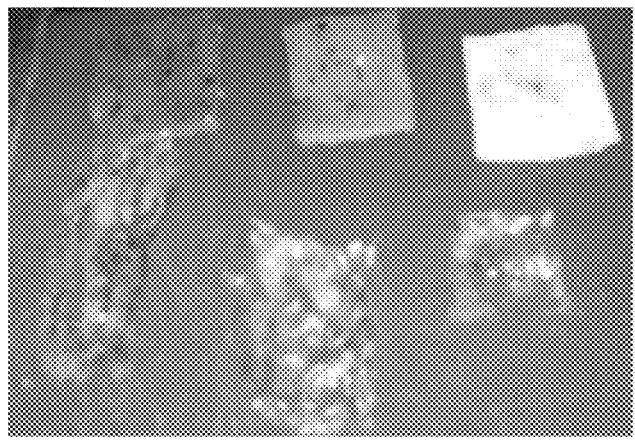
FIG. 2H-2I pictorial images showing a cured mixture in a raw and semi-dried state, according to certain embodiments.
Figure 2I:
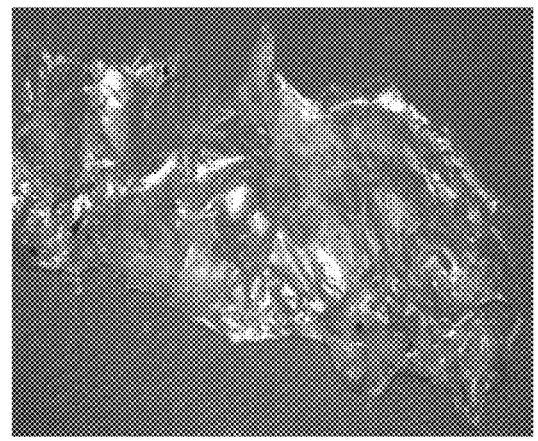
Figure 2J:
FIG. 2J is a pictorial image of the bio-derived wearable film (glove), according to certain embodiments.
Figure 3:
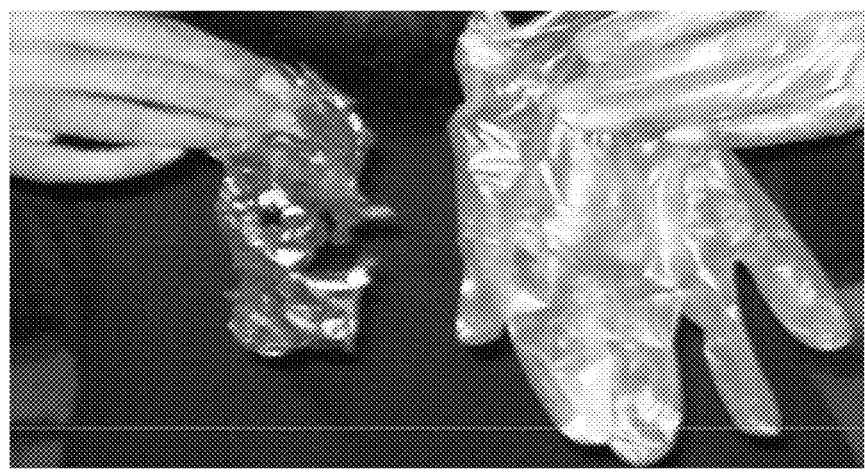
FIG. 3 is a pictorial image of a glove prepared by the method of present disclosure, according to certain embodiments.

In some embodiments, the bio-derived wearable film may be further compacted/molded into desired shapes, preferably as a glove (see FIGS. 2H-2J), by means and methods known in the art. FIG. 3 is a photograph of the glove prepared by the method of present disclosure. These gloves can be used for household cleaning, home improvement, food preparation, gardening, kitchen, cooking, dishwashing, pet care, lab work, tattooing, etc. In some embodiments, the gloves of the present disclosure can be used for surgical or laboratory purposes.

Figure 1C:
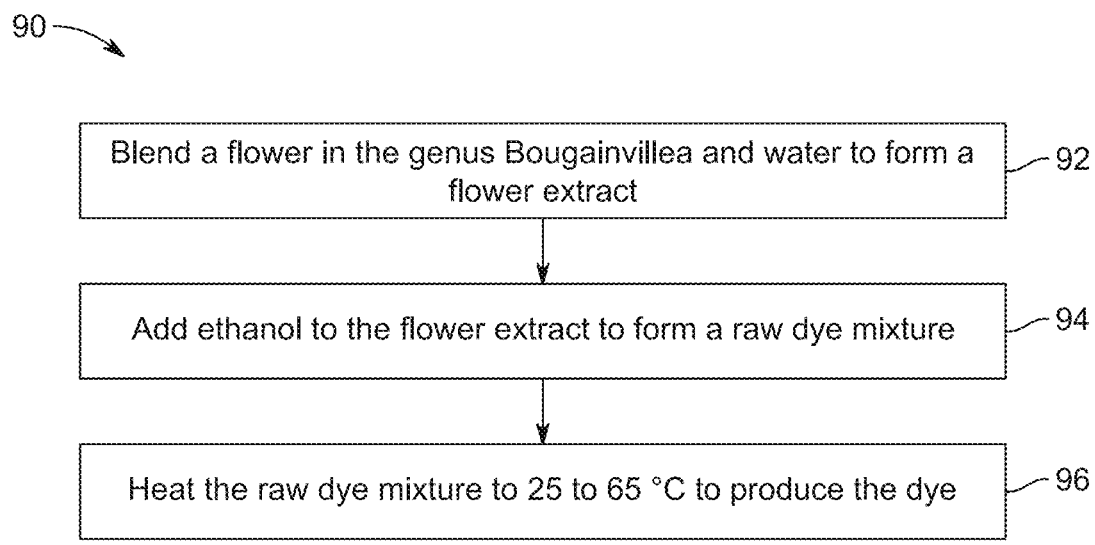
FIG. 1C is a flowchart depicting a method of producing a dye from a *Bougainvillea* plant, according to certain embodiments.

Referring to FIG. 1C, a method of making a dye derived from a flower in the genus *Bougainvillea*, is described. The order in which the method 90 is described is not intended to be construed as a limitation, and any number of the described method steps can be combined in any order to implement the method 90. Additionally, individual steps may be removed or skipped from the method 90 without departing from the spirit and scope of the present disclosure.

At step 92, method 90 includes blending a flower in the genus *Bougainvillea* with water to form a flower extract. For this purpose, fresh flowers may be collected or otherwise obtained and optionally rinsed/cleaned with water. In some embodiments, the flowers may be shredded to a size of about 1 to 5 cm, preferably 2 to 4 cm, preferably 2 to 3 cm. In general, the flowers may be shredded manually or using a shredder. In an embodiment, the flowers from *Bougainvillea* genus may be obtained from one or more of *Bougainvillea berberidifolia, Bougainvillea campanulata, Bougainvillea glabra, Bougainvillea herzogiana, Bougainvillea infesta, Bougainvillea lehmanniana, Bougainvillea malmeana, Bougainvillea modesta, Bougainvillea pachyphylla, Bougainvillea peruviana, Bougainvillea praecox, Bougainvillea spectabilis, Bougainvillea spinosa, Bougainvillea stipitata, Bougainvillea trollii, Bougainvillea buttiana, Bougainvillea arborea, Bougainvillea virescens, Bougainvillea bracteata, Bougainvillea pomacea, Bougainvillea herzogiana, Bougainvillea pachphylla, Bougainvillea spinosa, Bougainvillea lehmanianna*, and/or combinations thereof. In some embodiments, the flowers are obtained from *Bougainvillea glabra*. In some embodiments, a whole or part of the flower from *Bougainvillea glabra* may be used to prepare the extract. In some embodiments, the weight-by-volume ratio of the flowers to water is in the range of 1:5 to 5:1, preferably 1:4 to 4:1, more preferably 4:1. In some embodiments, after adding the flowers to water, the flowers may be blended by any of the blending techniques known in the art.

At step 94, the method 90 includes adding ethanol to the flower extract to form a raw dye mixture. In general, the ethanol can be any suitable percentage ethanol in water. In some embodiments, the ethanol can include another organic solvent, such as chloroform, ethyl acetate, ethanol, or a combination thereof. In some embodiments, the ethanol may be added to the flower extract for a period of 1 to 5 hours, preferably 2 to 4 hours, preferably 3 hours, to obtain the raw dye mixture.

At step 96, the method 90 includes heating the raw dye mixture to produce the dye. In some embodiments, the raw dye mixture is heated to 25 to 65° C., preferably 30 to 60° C., preferably 35 to 55° C., preferably 40 to 50° C., preferably 45° C. In some embodiments, the raw dye mixture is heated for 10 to 60 minutes, preferably 20 to 40 minutes, preferably 30 minutes to produce the dye. In some embodiments, the dye may be obtained by any other conventional methods known in the art.

EXAMPLES

The following examples demonstrate a method of making a wearable film derived from biomaterials is described. The examples are provided solely for illustration and are not to be construed as limitations of the present disclosure, as many variations thereof are possible without departing from the spirit and scope of the present disclosure.

Example 1: Delignification of Palm Stem Pith

For this purpose, raw palm stem pith fiber (palm stem pith fiber that does not contain too much lignin) was washed with Clorox (NaOCl) and sodium hypochlorite (15%) several times. The washing depends on the feedstock/sample and the type of hydrolysis. After washing, the palm stem pith fiber was blended in hot water many times. Also, acid hydrolysis using sulphuric acid (80%) was carried out to complete the de-lignification process.

Figure 4A:
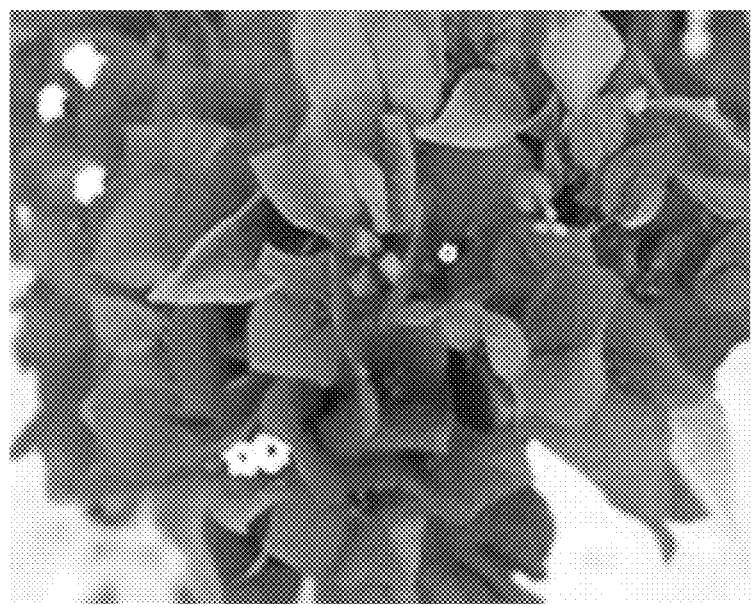
FIG. 4A shows an image of a *Bougainvillea* flower, according to certain embodiments.
Figure 4B:
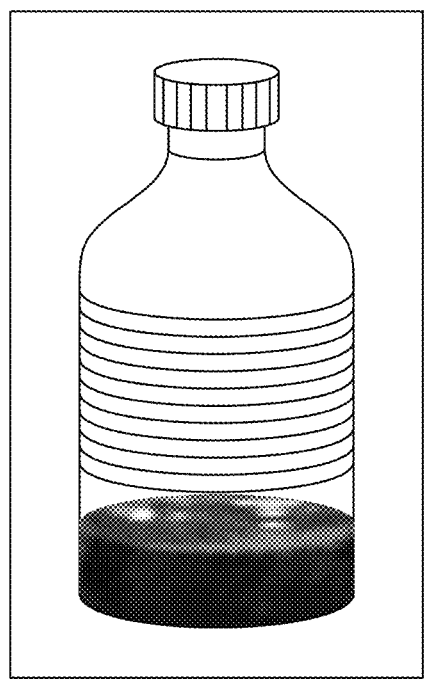
FIG. 4B shows an image of a *Bougainvillea* dye, according to certain embodiments.

Example 2: Preparation of *Bougainvillea* Dye by Ethanol Extraction 1.5 kg of *Bougainvillea* flower (*Bougainvillea glabra*) (FIG. 4A) was blended and mixed with water in a 4:1 ratio (*Bougainvillea*:water). The blended sample was then put into the ethanol solvent (70%) for 3 hours. Afterward, the color solution was extracted and made into a stain for dying by heating in the water bath at 45° C. for 30 minutes, followed by cooling to room temperature to obtain the *Bougainvillea* dye (FIG. 4B).

Example 3: pH and Cellulose Determination

The pH and cellulose content of the glove prepared by the method of present disclosure were determined, and their values were compared to those of synthetic films available in the market. The pH was determined using a Horiba Scientific pH meter, Japan. The quantitative determination of cellulose was carried out using methods known in the art. The results of this study are depicted in Table 1.

TABLE 1 pH and Cellulose determination

| Materials | pH determination | Cellulose determination |
|---|---|---|
| Glove | 7.5 ± 0.02 | 38.4% ± 0.2 |
| Synthetic glove | Alkaline ≥ 7 | It is zero if from gas or oil; if from cellulose sample, it is 20-40%. |

Mean ± SE (standard Error, n = 3)

Example 4: Nanoparticle Measurement

The particle size of the nanocellulose was measured by Scanning Electron Microscopy (SEM), and the results of this study are depicted in Table 2.

TABLE 2

Particle size

| Materials | Nanocellulose particle size (nm) |
|---|---|
| Glove | 20 nm |
| Standard size of nanocellulose particles | 1-100 nm |

Example 5: Absorption Test (as ASTM D570

The gloves prepared were further evaluated for their ability to absorb moisture. The tests to determine water absorption were carried out in accordance with ASTM D570. The purpose of ASTM D570 is to determine the rate of water absorption by immersing the specimen (glove) in water for a specific period of time. To perform the test, the gloves were dried in an oven for a specified time and temperature and then placed into the desiccator to cool. Immediately upon cooling, the gloves were weighed. The gloves were then submerged in water at agreed-upon conditions, often 23° C. for 48 h. The gloves were removed, patted dry with a lint-free cloth, and weighed. Water absorption was calculated by determining the percentage increase in weight of the sample following the experiment to characterize this attribute. The results of this study are depicted in Table 3. It can be observed that the water absorption for the glove prepared by the present disclosure is very low compared to synthetic gloves-suggesting their water-resistant property.

TABLE 3

Water absorption by ASTM D570

| Materials | Water absorption | water absorption ASTM D570 |
|---|---|---|
| Glove | 0.001% | 0-0.16% |
| Synthetic glove | 0-0.16% | |

Example 6: Burning Test

The gloves were burnt by using a gas burner. Odor, color of flame, speed of burning, and spark were observed by visual observation and compared with the synthetic gloves by ASTM D3801. The results of this study are depicted in Table 4.

TABLE 4

Burning test according to the ASTM D3801

| Materials | Odor | Color of flame | Speed of burning | Spark or not |
|---|---|---|---|---|
| Glove | Low odor | Yellow-orange | Slow | Spark |
| Synthetic glove | Low odor | Yellow-orange | Slow | Spark |

Example 7: Color Test

Spray coating dye was used as the mode of application. It was attached properly to the glove and dried after 1 h. The color dye drying time was 1.5 hours, which is less than the maximum of 2 hours, according to ASTM B 117. The results of this study are depicted in Table 5.

TABLE 5

Organic dye was used as the mode of application by ASTM B 117

| Materials | Color test (Drying time) | ASTM B117 |
|---|---|---|
| Glove | 1.5 h | Maximum 2 hours |
| Synthetic glove | 2 h (max). | Maximum 2 hours |

Example 8: Determination of Size and Shape Characteristics by ASTM a 500

The gloves were hit by a hammer continuously for 2 minutes and pulled on for 5 min. There was no change in its shape and size as per ASTM A500. The results of this study are depicted in Table 6.

TABLE 6

Size and shape characteristics

| Materials | Size and shape | ASTM A500 |
|---|---|---|
| Glove | No swell or shrink | Resistant characters |
| Synthetic glove | No swell or shrink | Resistant characters |

Example 9: Energy Test

The energy was tested for the glove using the following equation: $E=1/2mv^2$ in accordance with ASTM E1886. The results of this study are depicted in Table 7. The results were found to be comparable to the synthetic glove.

TABLE 7

| Energy test of the glove (ASTM E1886) | |
|---|---|
| Materials | Energy |
| Glove | 1.0 Joule |
| Synthetic glove | 1.0-25 Joule |

Example 10: Firmness Test

The gloves were hit by a hammer of 1 kg on the screw set on the biofilm. The hit was completed in 5 minutes. No bore or crack were observed as per ASTM D2925 or ASTM D5419, respectively. The results of this study are depicted in Table 8.

TABLE 8

| Firmness test represented by bore and crack test. | | |
|---|---|---|
| Materials | Bore test ASTM D2925 | Crack test by ASTM D5419 |
| Glove | No bore symptom | No crack symptom |
| Synthetic glove | No bore symptom | No Crack symptom |

Example 11: Tensile Test

The tensile test was done by a Universal Test Machine for bioplastics as ASTM D5083. For this purpose, the gloves were placed in the grips of a Universal Test Machine at a specified grip separation and pulled until failure. For ASTM D5083, the test speed was measured by the material specification. The default test speed was 5 mm/min (0.2 in/min), but modulus determination was made at 1.5 mm/min (0.057 in/min). A strain gauge was used to determine the elongation and tensile modulus. The Max Load Capacity was 50 kN/m$^2$, depending upon the reinforcement and type. The results of this study are depicted in Table 9.

TABLE 9

| Determination of tensile test by using ASTM by ASTM D5083 | | |
|---|---|---|
| Materials | Tensile strength (MPa/kg · m$^3$) | Tensile Modulus (GPa) |
| Glove | 70.0 | 1.0 |
| Synthetic glove | 70-230 (ASTM) | 1.0- 3.0 (ASTM D5083) |

Example 12: Chemical Element Test

The chemical element like K$^+$, CO$_3^{-2}$, Cl$^-$, Na$^+$ were tested using different meters. K$^+$ and Na$^+$ were tested by LAQUA twin K$^+$ meter and LAQUA twin Na$^+$ meter (Horiba, Japan). CO$_3^{-2}$, and Cl-were tested by Photometer PF-3 version A (Macherey-Nagel, Germany). Positive results are obtained for all the chemical elements for the glove prepared by the method of present disclosure in comparison to the synthetic glove as per European Standard EN166. The results of this study are depicted in Table 10.

TABLE 10

| Chemical element test | | | | |
|---|---|---|---|---|
| Materials | K$^+$ (PPM) | Na$^+$ (PPM) | Cl$^-$ (PPM) | CO$_3^{-2}$ (PPM) |
| Glove | 10.5 ± 0.4 | 5.1 ± 0.3 | 0.57 ± 0.02 | 142 ± 1.0 |
| Synthetic glove by EN (European Standard EN166) | 10 | 5 | 2 | 5-440 |

Mean ± standard error (SE, n = 3).

Numerous modifications and variations of the present disclosure are possible in light of the above teachings. Therefore, it is to be understood that within the scope of the appended claims, the invention may be practiced other than as specifically described herein.

The invention claimed is:

1. A method of producing a bio-derived wearable film, the method comprising
    blending palm stem pith and water to form a raw plant mixture;
    heating the raw plant mixture to form a cooked plant mixture;
    acid treating the cooked plant mixture with an aqueous acid at 30 to 60° C. to form a treated plant mixture;
    mixing the treated plant mixture with a starch, a cellulose, a synthetic polymer, a plant hydrogel, glycerin, and a dye to form an uncured mixture;
    heating the uncured mixture to 125 to 175° C. to form a cured mixture; and
    drying the cured mixture at 60 to 100° C. to form the bio-derived wearable film.

2. The method of claim 1, further comprising:
    prior to the heating the raw plant mixture, washing the palm stem pith with a sodium hypochlorite solution,
    adjusting a pH of the uncured mixture to a pH of 6.5 to 8.5, and
    wherein the dye is a flower dye obtained by:
        blending a flower in the genus *Bougainvillea* and water to form a flower extract;
        adding ethanol to the flower extract to form a raw dye mixture; and
        heating the raw dye mixture to 25 to 65° C. to produce the dye,
    wherein the palm stem pith is undried date palm stem pith,
    wherein aqueous acid is 80% sulfuric acid,
    wherein the starch is present in an amount of 5 to 15 wt. %;
    wherein the synthetic polymer is present in an amount of 2.5 to 7.5 wt. %;
    wherein the plant hydrogel is present in an amount of 12.5 to 22.5 wt. %;
    wherein the glycerin is present in an amount of 3.5 to 8.5 wt. %; and
    wherein the treated plant mixture is present in an amount of 31.5 to 76.5 wt. %,
    wherein wt. % is based on a total weight of the bio-derived wearable film,
    wherein the synthetic polymer is polyvinyl chloride,
    wherein the plant hydrogel comprises aloe vera gel, okra gel, and acacia *arabica* gel,
    wherein the bio-derived wearable film comprises 32.5 to 45 wt. % cellulose based on a total weight of bio-derived wearable film, has a tensile modulus of 0.25 to 2.0 GPa, and has a tensile strength of 50 to 100 MPa/kg·m$^3$;

wherein the cellulose is in the form of nanofibrils having a diameter of 5-10 nm and a length of less than 100 nm; and wherein the starch is a functionalized with a secondary alkyl xanthate.

3. The method of claim 1, wherein the raw plant mixture is heated to 125 to 175° C. at 15 to 45 PSI gauge.

4. The method of claim 1, wherein method further comprises, prior to the heating the raw plant mixture, washing the palm stem pith with a sodium hypochlorite solution.

5. The method of claim 1, the aqueous acid is 80% sulfuric acid.

6. The method of claim 1, wherein
the starch is present in an amount of 5 to 15 wt. %;
the synthetic polymer is present in an amount of 2.5 to 7.5 wt. %;
the plant hydrogel is present in an amount of 12.5 to 22.5 wt. %;
the glycerin is present in an amount of 3.5 to 8.5 wt. %; and
the treated plant mixture is present in an amount of 31.5 to 76.5 wt. %, each based on a total weight of the bio-derived wearable film.

7. The method of claim 1, wherein the synthetic polymer is polyvinyl chloride.

8. The method of claim 1, wherein the plant hydrogel comprises aloe vera gel, okra gel, and acacia *arabica* gel.

9. The method of claim 1, further comprising adjusting a pH of the uncured mixture to a pH of 6.5 to 8.5.

10. The method of claim 1, wherein the dye is a dye derived from a flower in the genus *Bougainvillea* and the method further comprises:
blending a flower in the genus *Bougainvillea* and water to form a flower extract;
adding ethanol to the flower extract to form a raw dye mixture; and
heating the raw dye mixture to 25 to 65° C. to produce the dye.

11. The method of claim 1, wherein the bio-derived wearable film comprises nanocellulose having a mean particle size of 10 to 35 nm.

12. The method of claim 1, wherein the bio-derived wearable film comprises 32.5 to 45 wt % cellulose based on a total weight of bio-derived wearable film,
has a tensile modulus of 0.25 to 2.0 GPa, and
has a tensile strength of 50 to 100 MPa/kg·m$^3$.

13. A non-woven bio-derived wearable film, comprising an acid-hydrolyzed palm stem pith;
a starch;
a cellulose;
a synthetic polymer;
a plant hydrogel;
glycerin; and
a dye.

14. The non-woven bio-derived wearable film of claim 13, wherein
the starch is present in an amount of 5 to 15 wt %;
the synthetic polymer is present in an amount of 2.5 to 7.5 wt %;
the plant hydrogel is present in an amount of 12.5 to 22.5 wt %; and
the glycerin is present in an amount of 3.5 to 8.5 wt %, each based on a total weight of bio-derived wearable film.

15. The non-woven bio-derived wearable film of claim 13, wherein the bio-derived wearable film comprises nanocellulose having a mean particle size of 10 to 35 nm.

16. The non-woven bio-derived wearable film of claim 13, wherein the bio-derived wearable film
comprises 32.5 to 45 wt % cellulose based on a total weight of the bio-derived wearable film;
has a tensile modulus of 0.25 to 2.0 GPa; and
has a tensile strength of 50 to 100 MPa/kg·m$^3$.

17. The non-woven bio-derived wearable film of claim 13, wherein the synthetic polymer is polyvinyl chloride.

18. The non-woven bio-derived wearable film of claim 13, wherein the plant hydrogel comprises aloe vera gel, okra gel, and acacia *arabica* gel.

19. The non-woven bio-derived wearable film of claim 13, wherein the bio-derived wearable
has a water absorption of 0.00 to 0.16% measured according to ASTM D570;
has a carbonate content of 100 to 200 ppm; and
shows no cracks when tested according to ASTM D5419.

20. The non-woven bio-derived wearable film of claim 13, wherein the dye is a dye derived from a flower in the genus *Bougainvillea*.

* * * * *